Figure 11:
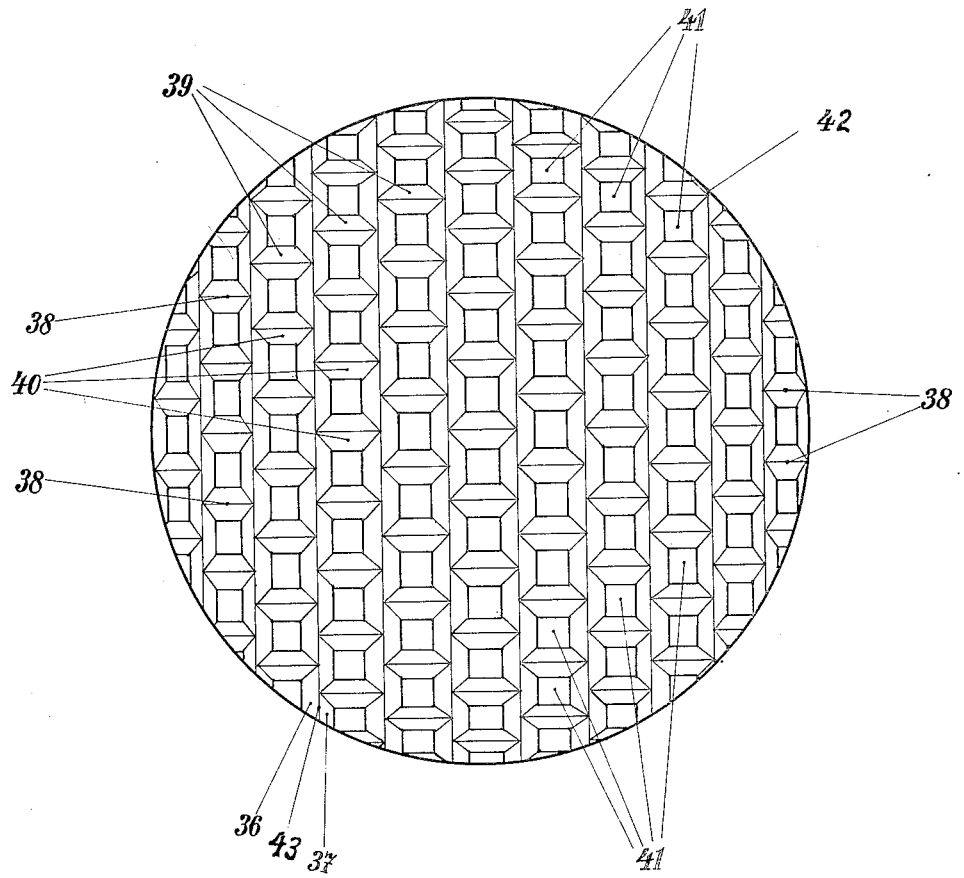

July 25, 1933.  G. KÖGEL  1,919,561
CONCAVE MIRROR
Filed Aug. 20, 1930  3 Sheets-Sheet 1
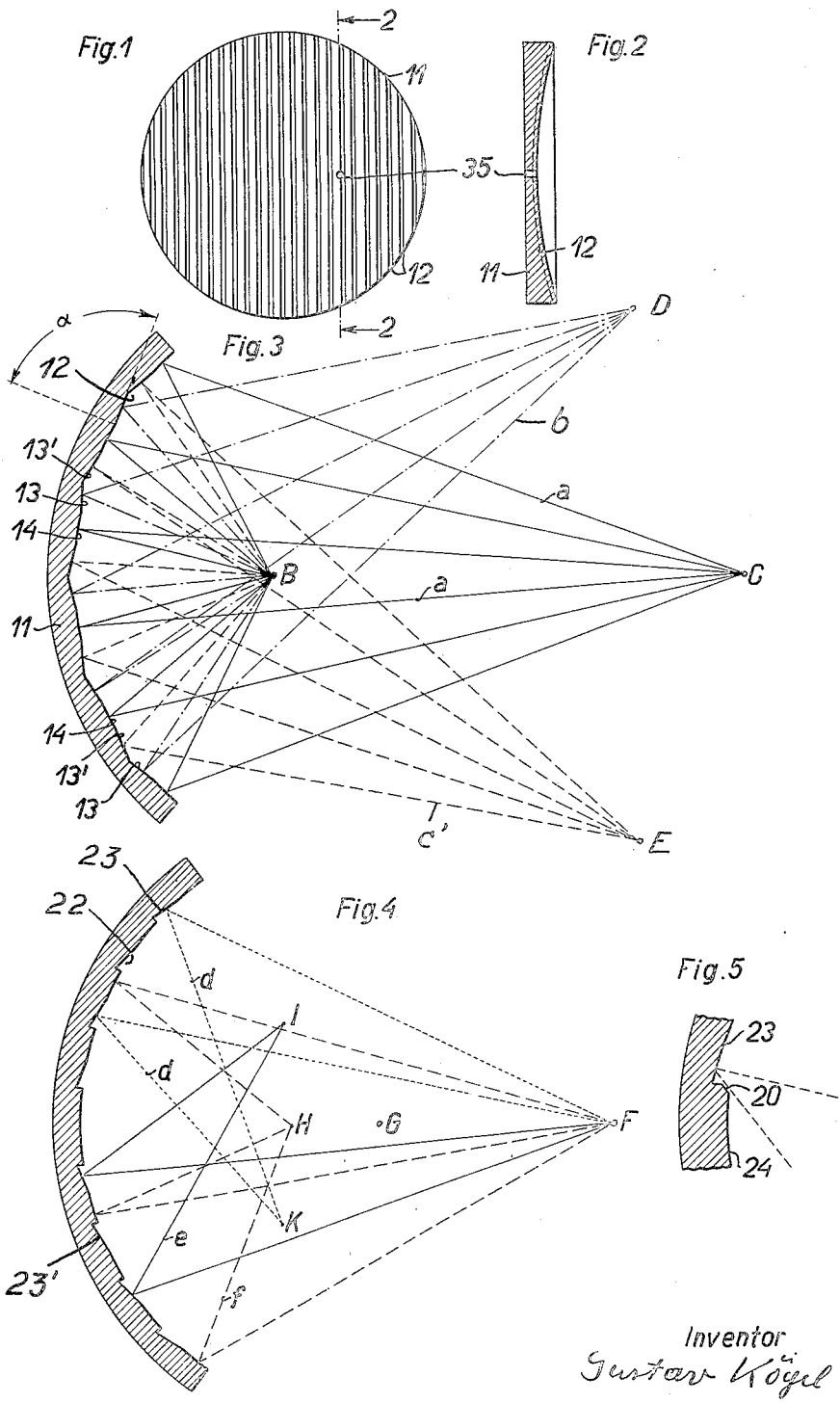

July 25, 1933. G. KÖGEL 1,919,561
CONCAVE MIRROR
Filed Aug. 20, 1930 3 Sheets-Sheet 2
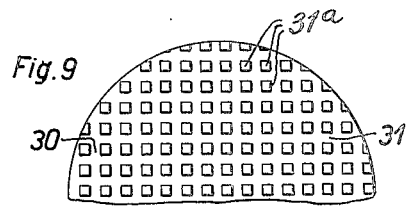
Fig. 9
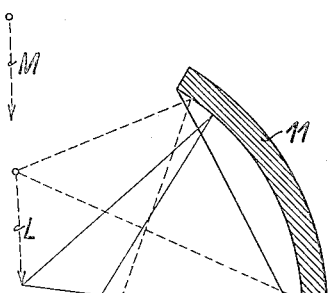
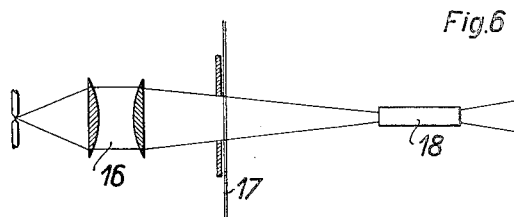
Fig. 6
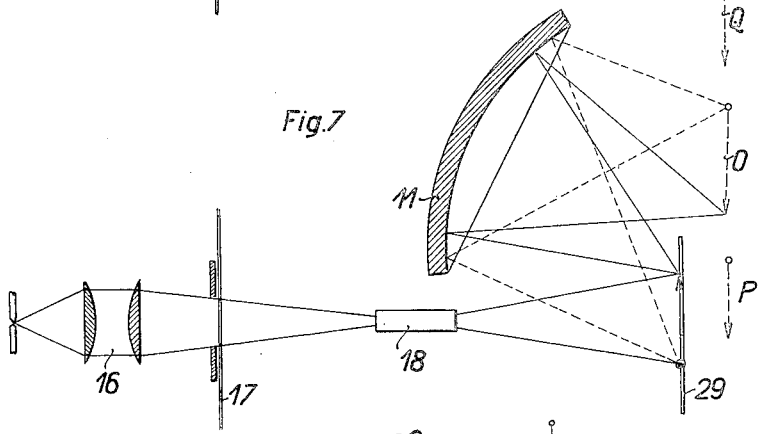
Fig. 7
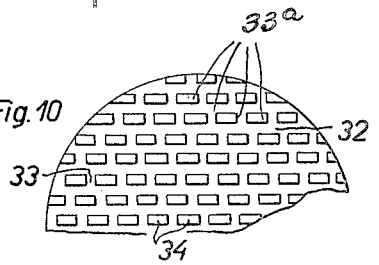
Fig. 10
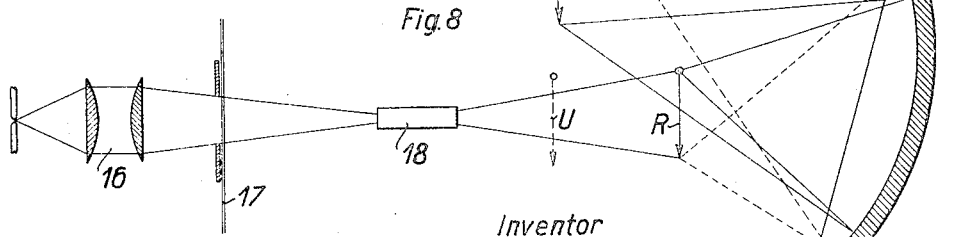
Fig. 8
Inventor
Gustav Kögel
by Franz Reinhard
Attorney Patented July 25, 1933

1,919,561

UNITED STATES PATENT OFFICE

GUSTAV KÖGEL, OF BADEN-BADEN, GERMANY

CONCAVE MIRROR

Application filed August 20, 1930, Serial No. 476,469, and in Germany April 29, 1929.

My invention relates to improvements in concave mirrors such as are used for inspecting photographs or other pictures or images produced by projection for improving the plastic effect. When using a concave mirror the picture or image can be completely seen only from a limited portion of the room. The object of the improvements is to provide a concave mirror by means of which also persons standing laterally of the main direction of reflection of the mirror can see the picture or image reflected by the mirror with an improved space effect. With this object in view my invention consists in providing the concave mirror in addition to the main reflecting surface with additional concave reflecting surfaces adapted to reflect the rays laterally and in the same direction and so as to combine into a lateral image of the picture, thus permitting the same to be inspected with improved plasticity from one or more sides. In the preferred embodiment of the invention the said additional reflecting surfaces are provided by latitudinal grooves cut into the body of the reflector, said grooves having laterally inclined reflecting side walls and being spaced from each other so that parts or strips of the main reflecting surface of the mirror are preserved between the grooves or additional reflecting surfaces.

For the purpose of explaining the invention several examples embodying the same have been shown in the accompanying drawings, in which the same reference characters have been used in all the views to indicate corresponding parts. In said drawings, Fig. 1 is an elevation showing the reflector provided with latitudinal grooves, Fig. 2 is a sectional elevation taken on the line 2—2 of Fig. 1, Fig. 3 is a sectional elevation on an enlarged scale showing a mirror and illustrating the reflection of an image, Fig. 4 is a similar sectional elevation showing a modification, Fig. 5 is a sectional elevation on an enlarged scale showing a modification of the reflector illustrated in Figure 4, Fig. 6 is a diagrammatical plan view showing a motion picture apparatus and a concave mirror used in connection therewith, Figs. 7 and 8 are similar diagrammatical plan views showing modifications of the system.

Figs. 9 and 10 are elevations showing modifications of the grooves cut into mirrors, and Fig. 11 is a more detailed showing of a mirror according to Fig. 10.

In the construction shown in Figs. 1 and 2 a concave mirror 11 is formed at its front or reflecting face with latitudinal grooves 12, located on the lines of intersection of the reflector and vertical planes parallel to the main axis of the reflector, and each formed with a reflecting side wall or side walls. The diameter and the radius of the reflecting surface of the said mirror may be different according to the picture or image to be inspected. For inspecting photographs the diameter may be comparatively small, say eight inches or more and for inspecting motion pictures it is equal to the length of the image projected on the screen, that is from 15 to 20 feet, and the radius of the reflecting surface may be from three feet to 30 feet or more. In all the figures the radii of the reflectors are reduced and the dimensions of the grooves 12 have been largely increased for more clearly illustrating the form of the said parts and the paths of the light rays.

In the example shown in Fig. 3 the reflecting surface of the reflector 11 is provided with grooves 12 disposed parallel to each other and each having its side walls 13, 13' inclined to opposite sides, the said grooves being spaced from each other to provide parallel strips 14 located in the main reflecting surface of the reflector. The side walls 13 and 13' have reflecting surfaces. The rays coming from a picture B and impinging on the main reflecting surfaces 14 are reflected in the directions indicated by the letters $a$, so that the picture can be seen from parts near the optical axis B—C of the main reflecting surface 14. The rays emanating from the picture B and impinging on the side walls 13 of the grooves are reflected in the directions indicated by the letter $b$, and the rays impinging on the side walls 13' are reflected in the directions $c'$. Thus images D and E are produced and the picture B may be inspected also from the lateral parts of the room.

The breadth of the strips 14 and the side walls 13 and 13' of the grooves depends on the size of the picture to be inspected and the details thereof. For inspecting pictures having small details the said surfaces must be comparatively narrow. For practical purposes the breadth of the said side walls and strips is less than one millimeter, but it may be several millimeters. Ordinarily it is not larger than ten millimeters. The angle $\alpha$ included between the side walls 13 and 13' and the radius of the main reflecting surface 14 depends on the desired direction of the reflected rays $b$ and $c'$. Practically it is 45° or more, and for all the side walls 13 and 13' the said angle is alike so that all the rays $b$ and $c'$ pass respectively through the points D and E. The said surfaces may be manufactured in different ways. In case of reflectors made from glass the reflective coating of the strips 14 is applied to the front or rear wall of the reflector, while the reflective coating of the side walls 13 and 13' is applied to the front wall of the said side walls. The reflector may be made from polished metal or from a plastic material which after hardening has a reflective coating applied thereto. Further, the reflector may be composed of sections, for example of sections containing the strips 14, sections containing the side walls 13, and sections containing the side walls 13'.

In the modification shown in Fig. 4 the grooves 22 are cut so that only one reflecting surface 23 or 23' is provided, and the said side walls are inclined at opposite sides of the optical axis in different directions. Thus the side walls 23 located at one side of the mirror reflect the rays in the directions $d$ and to one side of the optical axis, while the side walls 23' reflect the rays in the directions $e$ and to the opposite side of the optical axis. The main reflecting surfaces 24 reflect the rays in the directions $f$.

As shown in Fig. 5 the edges of the surfaces 24 are faceted as is shown at 20 so that the rays reflected from the surfaces 23 and 23' are not intercepted.

In the construction shown in Fig. 3 the picture B is located near the reflector, and the reflected images C, D, E are located far away from said reflector. In the modification shown in Fig. 4 the picture F is located in front of the center G of the main reflecting surface 24 and the images H, I and K are located between the said center and the reflector.

In Fig. 6 I have illustrated the reflector in a system for the projection of motion pictures. The system comprises a source of light including a condenser 16, a film 17 moving across the said source of light, an objective 18 and a translucent plate 19. The image thrown on the said plate 19 is inspected through the reflector 11 constructed in the manner described with reference to Fig. 3 or Fig. 4. The main reflecting surfaces 14 of the reflector reflect the rays nearly in a direction parallel to the axis of the system thus producing an image L, and the side walls of the grooves of the reflector reflect the rays in lateral directions thus producing images M and N. It will be understood that ordinarily the translucent plate 19 is located at a higher level than the reflector 11, and that the reflector 11 is located at a higher level than the audience, so that the rays emanating from the translucent plate 19 and reflected by the reflector 11 are directed downwardly.

In the modification shown in Fig. 7 a projection system is used which is similar in construction to the system shown in Fig. 6, and the same letters of reference have been used to indicate corresponding parts. But the projection system throws the light on an opaque screen 29, and the reflector 11 is located so that the rays are reflected in the direction of the rays coming from the source of light. The images produced by the reflector 11 have been indicated O, P and Q, and it will be understood that also in this case the said images are located below the screen 29.

In Fig. 8 I have shown a modification in which a dimmed film is used and in which therefore a screen or a translucent plate are dispensed with. The system comprises a projection system 16, 17, 18 producing an image R, which image is reflected by the reflector 11 in three directions to produce three images S, T and U.

Fig. 9 shows a reflector provided with vertical grooves 30 parallel to the main axis of the mirror and horizontal grooves 31 cutting the vertical grooves rectangularly. The grooves 30 and 31 have reflecting side walls inclined in opposite directions relatively to the main reflecting surface. The grooves are spaced from each other so that parts 31a of the main reflecting surface are preserved. Fig. 10 shows a modification wherein the mirror is provided with vertical grooves 32 and discontinuous horizontal grooves 33, cutting the vertical grooves rectangularly but forming together sections in the manner of brick work preserving parts 33a of the main reflecting surface of the mirror. Fig. 11 is a view of a mirror according to Fig. 10 in a more detailed construction. 42 is the concave mirror, which is provided with vertical, parallel grooves 43 with the reflecting side walls 36 and 37 and with horizontal, discontinuous grooves 38 with the reflecting side walls 39 and 40. The parts of the main reflecting surface preserved between the grooves are designated by 41.

For the purposes of acoustic films the mirror is provided with holes 35 permitting the rays to pass to the sound reproducing apparatus.

I claim:

1. A concave mirror provided at its main reflecting surface with additional reflecting surfaces spaced from each other so that strips of the main reflecting surface of the mirror are preserved between the additional reflecting surfaces, the latter being inclined relatively to the main reflecting surface in directions and at angles for producing a plurality of lateral images, the additional reflecting surfaces inclined to the same side of the main axis of the mirror being disposed so as to produce a single image.

2. A concave mirror provided at its main reflecting surface with additional reflecting surfaces parallel to the main axis of the mirror and spaced from each other so that strips of the main reflecting surface of the mirror are preserved between the additional reflecting surfaces, the latter being inclined relatively to the main reflecting surface in directions and at angles for producing a plurality of lateral images, the additional reflecting surfaces inclined to the same side of the main axis of the mirror being disposed so as to produce a single image.

3. A concave mirror provided at its main reflecting surface with grooves spaced from each other so that strips of the main reflecting surface of the mirror are preserved between every two grooves, said grooves having reflecting side walls inclined relatively to the main reflecting surface in directions and at angles for producing a plurality of lateral images.

4. A concave mirror provided at its main reflecting surface with grooves parallel to the main axis of the mirror and spaced from each other so that strips of the main reflecting surface of the mirror are preserved between every two grooves, said grooves having reflecting side walls inclined in opposite directions relatively to the main reflecting surface, the reflecting side walls inclined respectively to the same side of the main axis of the mirror being disposed relatively to the main reflecting surface at angles such as to produce a single lateral image.

5. A concave mirror provided at its reflecting surface with vertical grooves parallel to the main axis of the mirror and horizontal grooves cutting the vertical grooves rectangularly, said grooves being spaced from each other so that parts of the main reflecting surface of the mirror are preserved between the grooves, said grooves having reflecting side walls inclined in opposite directions relatively to the main reflecting surface and at angles for producing a plurality of lateral images.

6. A concave mirror provided at its reflecting surface with vertical grooves parallel to the main axis of the mirror and horizontal discontinuous grooves cutting the vertical grooves rectangularly, thus forming sections in the manner of brick work, said grooves being spaced from each other so that parts of the main reflecting surface of the mirror are preserved between the grooves, said grooves having reflecting side walls inclined in opposite directions relatively to the main reflecting surface and at angles for producing a plurality of lateral images.

GUSTAV KÖGEL.